US012182556B2

(12) United States Patent
Medicherla et al.

(10) Patent No.: US 12,182,556 B2
(45) Date of Patent: Dec. 31, 2024

(54) METHOD AND SYSTEM FOR PERFORMING PROGRAM TRANSFORMATIONS FOR PRECISE ANALYSIS OF ENTERPRISE APPLICATIONS

(71) Applicant: Tata Consultancy Services Limited, Mumbai (IN)

(72) Inventors: Raveendra Kumar Medicherla, Bangalore (IN); Shrishti Pradhan, Pune (IN); Ravindra Dinakar Naik, Pune (IN); Shivani Pravin Kondewar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 105 days.

(21) Appl. No.: 18/179,963

(22) Filed: Mar. 7, 2023

(65) Prior Publication Data
US 2023/0297355 A1    Sep. 21, 2023

(30) Foreign Application Priority Data

Mar. 15, 2022   (IN) .............................. 202221014000

(51) Int. Cl.
*G06F 9/44*   (2018.01)
*G06F 8/30*   (2018.01)
(Continued)

(52) U.S. Cl.
CPC .................. *G06F 8/51* (2013.01); *G06F 8/31* (2013.01); *G06F 8/42* (2013.01)

(58) Field of Classification Search
CPC ..... G06F 8/31; G06F 8/76; G06F 8/72; G06F 8/51; G06F 8/74; G06N 20/00; G06N 5/046

(Continued)

(56) References Cited

U.S. PATENT DOCUMENTS

2018/0052898 A1* 2/2018 Allan .................. G06F 16/2358
2019/0324755 A1* 10/2019 Herr .......................... G06F 8/45
2020/0184376 A1* 6/2020 Parameswaran ....... G06N 20/00

OTHER PUBLICATIONS

Jana, Angshuman et al., "Extending Abstract Interpretation to Dependency Analysis of Database Applications", IEEE Transactions on Software Engineering, Date: 2018, vol. 46, Issue: 5, pp. 463-494, Publisher: IEEE, https://www.iitp.ac.in/~halder/Papers/Journal/TSE_2020.pdf.

(Continued)

*Primary Examiner* — Chuck O Kendall
(74) *Attorney, Agent, or Firm* — FINNEGAN, HENDERSON, FARABOW, GARRETT & DUNNER LLP

(57) ABSTRACT

For performing analysis of enterprise application, code analysis tools may be used. But currently available analysis tools lack support for analyzing database processing statements, such as structured query language (SQL) statements and inter-service communication statements that may be present along with the programming language statements in the computer program. Present disclosure provides method and system for performing program transformations for precise analysis of enterprise applications. The system transform each database processing statement present in a computer program associated with the enterprise application into host programming language statement and each service call into function call statements. In particular, the system replaces syntax of embedded language with equivalent host programming language syntax. The system then uses existing code analyzers for performing analysis of the computer program to get data flow information of the computer program.

18 Claims, 7 Drawing Sheets

(51) Int. Cl.
*G06F 8/41* (2018.01)
*G06F 8/51* (2018.01)

(58) Field of Classification Search
USPC ................................................ 717/105–120
See application file for complete search history.

(56) References Cited

OTHER PUBLICATIONS

Halder, Raju et al., "Abstract Program Slicing of Database Query Languages", ACM Symposium on Applied Computing, Date: Mar. 2013, pp. 838-845, Publisher: ACM, https://www.researchgete.net/publication/236607046_Abstract_Program_Slicing_of_Database_Query_Languages/link/02e7e5183a207e7579000000/download.

Emani, K. Venkatesh, "Optimizing Data Access in Database Applications using Static Analysis", Thesis, Date: 2019, Publisher: Microsoft, https://www.microsoft.com/en-us/research/uploads/prod/2021/02/Unsigned_Long_Thesis_VenkateshEmani/pdf.

Jana, Angshuman et al., "Defining Abstract Semantics for Static Dependence Analysis of Relational Database Applications", Information Systems Security, Date: Dec. 2016, pp. 151-171, Publisher: Springer, https://www.iitp.ac.in/~hakter/Papers/Conference/ICISS_2016.pdf.

Cheung, Alvin et al., "Using Program Analysis to Improve Database Applications", IEEE Data Eng. Bull, Date: 2014, Publisher: IEEE, http://sites.computer.org/debull/A14mar/p48.pdf.

Cleve, Anthony, "Program analysis and transformation for data-intensive system evolution", International Conference on Software Maintenance, Date: Sep. 2010, Publisher: IEEE, https://dial.uclouvain.be/downloader/downloader.php?pid=boreal:28682&datastream=PDF_01.

* cited by examiner receiving, by a program transformation system via one or more hardware processors, a computer program written in a high-level host programming language, wherein the computer program comprises a plurality of host programming language statements, one or more domain specific language (DSL) statements and one or more service calls
402 transforming, by the program transformation system via the one or more hardware processors, each DSL statement present in the computer program into one or more host programming language statements using a predefined DSL abstraction template to obtain a primary transformed computer program, wherein each host programming language statement of the one or more host programming language statements in the primary transformed computer program comprise an abstract function call that is configured to retain effect of a portion of a DSL statement from which the corresponding abstract function call is obtained
404 updating, by the program transformation system via the one or more hardware processors, each service call of the one or more service calls present in the primary transformed computer program with a function call statement using a predefined service registry to obtain a secondary transformed computer program
406 computing, by the program transformation system via the one or more hardware processors, one or more analysis on the secondary transformed computer program using a host programming language based code analyzer to obtain intermediatory analysis information
408 performing, by the program transformation system via the one or more hardware processors, dependency analysis of the computer program based on the intermediatory analysis information using the host programming language based code analyzer, wherein the dependency analysis comprises information about one or more variables that are present in the computer program
410

| SQL Query | | Abstraction Function | Effect on Host Variables | Summary specification in facts file |
|---|---|---|---|---|
| Type | Clause | | | |
| SELECT | WHERE | sqlSelectWhere | Used | sqlSelectWhere(use):parm1,parm2,.... |
| SELECT | INTO | sqlSelectInto | Modified | sqlSelectInto(mod):parm1,parm2,.... |
| DECLARE CURSOR | WHERE | sqlSelectWhere | Used | sqlSelectWhere(use):parm1,parm2,.... |
| FETCH | INTO | sqlFetchInto | Modified | sqlFetchInto(use): parm1, parm2,.... |
| INSERT | VALUES | sqlInsertValues | Used | sqlInsertValues(use):parm1,parm2,.... |
| UPDATE | WHERE | sqlUpdateWhere | Used | sqlUpdateWhere(use):parm1,parm2,.... |
| UPDATE | SET | sqlUpdateSet | Used | sqlUpdateSet(use):parm1,parm2,.... |
| DELETE | WHERE | sqlDeleteWhere | Used | sqlDeleteWhere(use):parm1,parm2,.... |
| | | sqlCodeUpdate | Modified | sqlCodeUpdate(mod): parm1 |
| All other SQL statements | | No operation | | |

FIG. 8

METHOD AND SYSTEM FOR PERFORMING PROGRAM TRANSFORMATIONS FOR PRECISE ANALYSIS OF ENTERPRISE APPLICATIONS

PRIORITY CLAIM

This U.S. patent application claims priority under 35 U.S.C. § 119 to: Indian Patent Application No. 202221014000, filed on Mar. 15, 2022. The entire contents of the aforementioned application are incorporated herein by reference.

TECHNICAL FIELD

The disclosure herein generally relates to program analysis, and, more particularly, to a method and a system for performing program transformations for precise analysis of enterprise applications.

BACKGROUND

Generally, Enterprise Information Systems (EIS) include programs that are written in high level programming languages, such as C, C++, Java, Common Business Oriented Language (COBOL), and the like. The programs may also include some database processing and inter-service communication statements for functioning of the EIS. Companies that offer re-engineering services for such EIS rely either on manual analysis or on code analysis tools to understand the flow of control and data within and across the programs during the reverse-engineering phase.

Currently, code analyzers that are available for performing program analysis are developed for commonly used programming languages so that they can be re-used across multiple re-engineering projects. In general, they lack support for analyzing database processing statements, such as structured query language (SQL) statements and inter-service communication statements that may be present along with the programming language statements in the programs.

Few analyzers are available in the art that can process database processing statements. However, these analyzers cannot guarantee precise analysis of the program with mixed syntax of SQLs and service invocation calls that dynamically invoke other programs.

Additionally, even if an analyzer that can process mixed syntax is built, due to large variations in the syntax, the cost of building such analyzer will be so high that building such analyzer will never be considered as the same analyzer cannot be reused again for other re-engineering projects.

SUMMARY

Embodiments of the present disclosure present technological improvements as solutions to one or more of the above-mentioned technical problems recognized by the inventors in conventional systems. For example, in one aspect, there is provided a processor implemented method for performing program transformations for precise analysis of enterprise applications. The method comprises receiving, by a program transformation system via one or more hardware processors, a computer program written in a high-level host programming language, wherein the computer program comprises a plurality of host programming language statements, one or more domain specific language (DSL) statements and one or more service calls; transforming, by the program transformation system via the one or more hardware processors, each DSL statement present in the computer program into one or more host programming language statements using a predefined DSL abstraction template to obtain a primary transformed computer program, wherein each host programming language statement of the one or more host programming language statements in the primary transformed computer program comprise an abstract function call that is configured to retain effect of a portion of a DSL statement from which the corresponding abstract function call is obtained; updating, by the program transformation system via the one or more hardware processors, each service call of the one or more service calls present in the primary transformed computer program with a function call statement using a predefined service registry to obtain a secondary transformed computer program; computing, by the program transformation system via the one or more hardware processors, one or more analysis on the secondary transformed computer program using a host programming language based code analyzer to obtain intermediatory analysis information; and performing, by the program transformation system via the one or more hardware processors, dependency analysis of the computer program based on the intermediatory analysis information using the host programming language based code analyzer, wherein the dependency analysis includes information about one or more variables that are present in the computer program.

In another aspect, there is provided a program transformation system for performing program transformations for precise analysis of enterprise applications. The system comprises a memory storing instructions; one or more communication interfaces; and one or more hardware processors coupled to the memory via the one or more communication interfaces, wherein the one or more hardware processors are configured by the instructions to: receive a computer program written in a high-level host programming language, wherein the computer program comprises a plurality of host programming language statements, one or more domain specific language (DSL) statements and one or more service calls; transform each DSL statement present in the computer program into one or more host programming language statements using a predefined DSL abstraction template to obtain a primary transformed computer program, wherein each host programming language statement of the one or more host programming language statements in the primary transformed computer program comprise an abstract function call that is configured to retain effect of a portion of a DSL statement from which the corresponding abstract function call is obtained; update each service call of the one or more service calls present in the primary transformed computer program with a function call statement using a predefined service registry to obtain a secondary transformed computer program; compute one or more analysis on the secondary transformed computer program using a host programming language based code analyzer to obtain intermediatory analysis information; and perform dependency analysis of the computer program based on the intermediatory analysis information using the host programming language based code analyzer, wherein the dependency analysis includes information about one or more variables that are present in the computer program.

In yet another aspect, there are provided one or more non-transitory machine-readable information storage mediums comprising one or more instructions which when executed by one or more hardware processors cause program transformations for precise analysis of enterprise applications using: receiving, by a program transformation system, a computer program written in a high-level host programming language, wherein the computer program comprises a plurality of host programming language statements, one or more domain specific language (DSL) statements and one or more service calls; transforming, by the program transformation system, each DSL statement present in the computer program into one or more host programming language statements using a predefined DSL abstraction template to obtain a primary transformed computer program, wherein each host programming language statement of the one or more host programming language statements in the primary transformed computer program comprise an abstract function call that is configured to retain effect of a portion of a DSL statement from which the corresponding abstract function call is obtained; updating, by the program transformation system, each service call of the one or more service calls present in the primary transformed computer program with a function call statement using a predefined service registry to obtain a secondary transformed computer program; computing, by the program transformation system, one or more analysis on the secondary transformed computer program using a host programming language based code analyzer to obtain intermediatory analysis information; and performing, by the program transformation system, dependency analysis of the computer program based on the intermediatory analysis information using the host programming language based code analyzer, wherein the dependency analysis includes information about one or more variables that are present in the computer program.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4 illustrates an exemplary flow diagram of a method for performing program transformations for precise analysis of the enterprise applications, in accordance with an embodiment of the present disclosure.

FIG. 8 is an example representation of a predefined DSL abstraction template, in accordance with an embodiment of the present disclosure.

DETAILED DESCRIPTION

Figure 1:
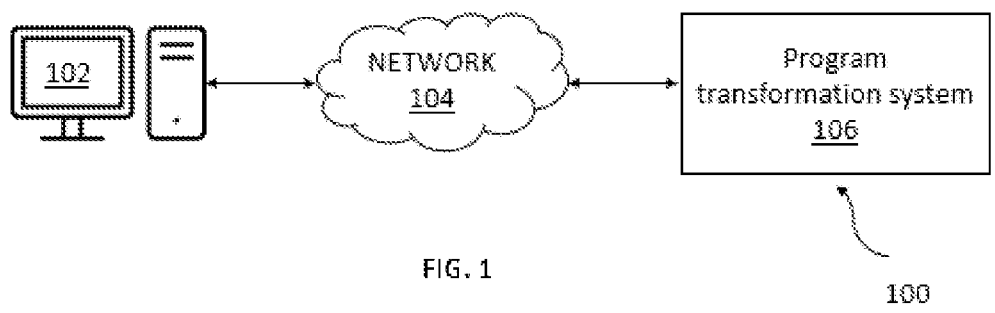
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In an enterprise information system (EIS), the business logic is usually implemented as a set of service functions (SVC) that are typically written in a high-level host programming languages such as COBOL, Java, and C. The programs may also contain some domain specific language (DSL) statements that will be embedded within the host language program (referred as embedded program) in order to support database queries or to invoke Transaction Processor (TPM) services.

Currently, Enterprise Application Modernization (EAM) is a constant requirement of IT industry. In EAM, old legacy EISs are modernized to new systems using re-engineering services for a better total cost of ownership (TCO) and business alignment.

While performing re-engineering of a legacy EIS, the application analyst may use automatic code analysis tools to write business logic specifications for the modernized new system. Basically, automatic code analysis tools are used by the analysts to identify business rules that are implemented in the source code. One of technique that might be used for identifying business rule may include identifying all the input variables that are impacting the values of specific variables present at a given location in the program. Code analysis tools that can perform data-flow analysis can identify impacting variables. However, generic code analyzers that are built for the host programming language will fail to identify such variables when used to analyze embedded programs.

One solution for the stated problem can be enhancement of the code analysis tools to support DSL statements along with the host language program. However, enhancing tool require significant changes that needs to be done in the tool. Further, companies that offer reengineering services generally like to maintain code analyzers that can be reused across multiple projects, and the variations in programming language and the extended database query syntax make it hard to reuse the enhanced code analyzer created for one project in some other project. Therefore, enhancing the code analyzer to support mixed syntax is not economical and often not feasible.

So, a technique that can provide analysis of the mixed syntax programs while ensuring accuracy of the analysis is still to be explored.

Embodiments of the present disclosure overcome the above-mentioned disadvantages by providing a method and a system for performing program transformations for precise analysis of enterprise applications. The system of the present disclosure, instead of enhancing the existing code analyzers, transform each DSL statement present in a computer program into host programming language statement and each service call into function call statements. In particular, the system replaces/substitutes syntax of embedded language with equivalent host language syntax. The system then uses existing code analyzers for performing analysis of the computer program to get data flow information of the computer program.

In the present disclosure, the system and the method transform the program written in mixed syntax into host language programs that can be analyzed using existing code analyzers, thereby eliminating need of enhancing existing code analyzers to support mixed syntax analysis while improving accuracy of the analysis. Further, the system and the method replace statements present in program that does not play any role in the analysis of the program with skip statements, thereby reducing time taken in performing analysis of the programs.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, transforming domain specific language (DSL) statements into host programming language statements, replacing service call statements with function call statements, etc. The environment 100 generally includes an electronic device, such as an electronic device 102, and a program transformation system 106, each coupled to, and in communication with (and/or with access to) a network 104. It should be noted that one electronic device is shown for the sake of explanation; there can be more number of electronic devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The electronic device 102 is associated with a user (e.g., a user or an entity such as an organization) who wants to perform application modernization of an enterprise information system (EIS). Examples of the electronic device 102 include, but are not limited to, a personal computer (PC), a mobile phone, a tablet device, a Personal Digital Assistant (PDA), a server, a voice activated assistant, a smartphone, and a laptop.

In an embodiment, the program transformation system 106 is associated with a service provider who is offering reengineering service for the EIS.

The program transformation system 106 includes one or more hardware processors and a memory. The program transformation system 106 is configured to perform one or more of the operations described herein. The program transformation system 106 is configured to receive computer program associated with the EIS via the network 104 from the electronic device 106. The computer program is written in one of a high-level host programming language, such as C, COBOL, Java™, and the like. The computer program includes a plurality of host programming language statements, one or more domain specific language (DSL) statements, such as structured query language (SQL) statements and one or more service calls, such as transaction processor (TPM) calls. The program transformation system 106 is then configured to perform pre-compilation of the computer program using a pre-compiler to obtain pre-compiled host programming language program. Thereafter, the program transformation system 106 is configured to transform each DSL statement present in the pre-compiled host programming language program into one or more host programming language statements using a predefined DSL abstraction template to obtain a primary transformed computer program. In particular, the pre-compiled host programming language program includes one or more host programming language blocks that are obtained by converting one or more DSL statements present in the computer program using the pre-compiler. The host programming language blocks obtained after pre-compilation are equivalent to DSL statements. The process of transforming each DSL statement into host programming language statements is explained in detail with reference to FIG. 4. Once the primary transformed computer program is available, the program transformation system 106 is configured to update each service call of the one or more service calls present in the primary transformed computer program with a function call statement using a predefined service registry to obtain a secondary transformed computer program. The process of updating each service call into function call statements is explained in detail with reference to FIG. 4.

Thereafter, the program transformation system 106 computes pointer analysis, reaching definition analysis, and def-use analysis on the secondary transformed computer program a host programming language based code analyzer to obtain intermediatory analysis information that is further utilized by the program transformation system 106 to perform dependency analysis of the computer program. The dependency analysis includes information about one or more variables that are present in the computer program. The information associated with each variable includes a list of locations and variables on which the respective variable at a given location depends on. It should be noted that the host programming language based code analyzer is a code analysis tool that is already available in the art. Examples of the code analysis tool that can be used include, but are not limited to, Frama-C, CPAchecker, DMS Software Reengineering Toolkit, and the like.

Further, the program transformation system 106 uses the dependency analysis either for performing impact analysis or for recovering business rule specifications from EIS.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
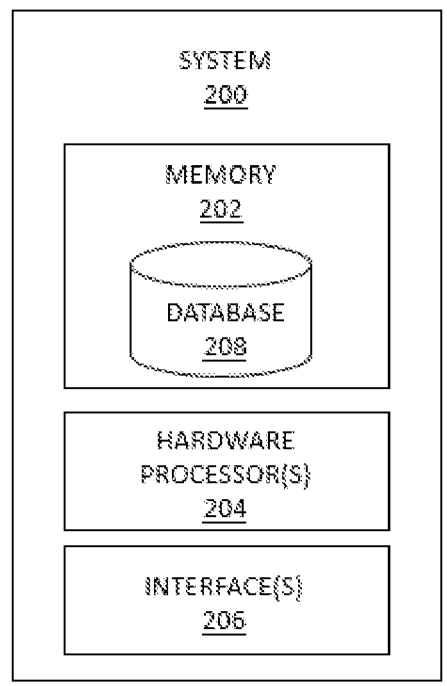
FIG. 2 illustrates an exemplary block diagram of a system for performing program transformations for precise analysis of enterprise applications, in accordance with an embodiment of the present disclosure.

FIG. 2 illustrates an exemplary block diagram of a program transformation system 200 for performing program transformations for precise analysis of enterprise applications, in accordance with an embodiment of the present disclosure. In an embodiment, the program transformation system 200 may also be referred as system and may be interchangeably used herein. The system 200 is similar to the program transformation system 200 explained with reference to FIG. 1. In some embodiments, the system 200 is embodied as a cloud-based and/or SaaS-based (software as a service) architecture. In some embodiments, the system 200 may be implemented in a server system. In some embodiments, the system 200 may be implemented in a variety of computing systems, such as laptop computers, notebooks, hand-held devices, workstations, mainframe computers, and the like.

In an embodiment, the system 200 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 200 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 may comprise, but are not limited to, a predefined DSL abstraction template, a predefined service registry, dependency analysis results, and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

Figure 3:
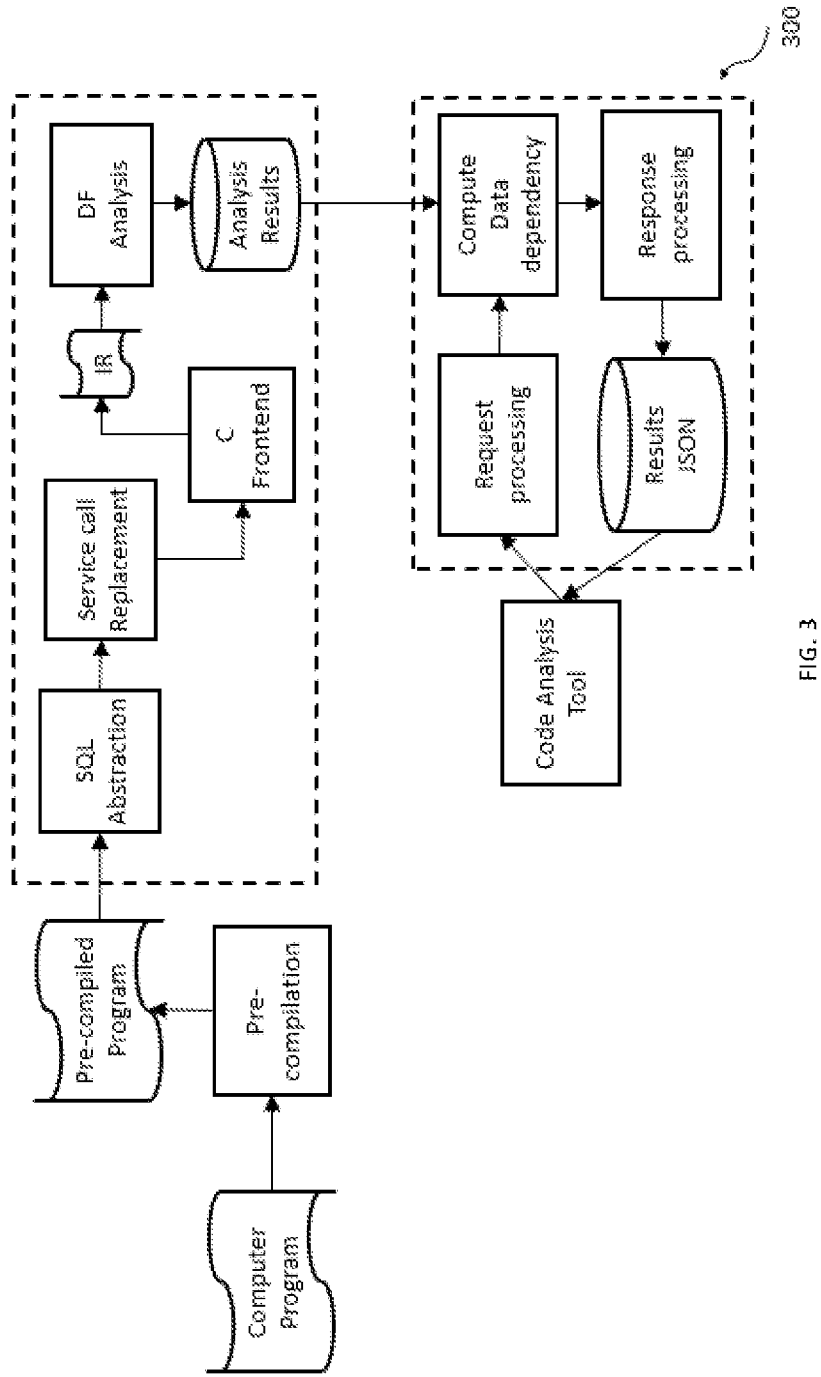
FIG. 3 illustrates a schematic block diagram representation of a program transformation process for precise analysis of the enterprise applications, in accordance with an embodiment of the present disclosure.

FIG. 3, with reference to FIGS. 1-2, illustrates a schematic block diagram representation 300 of a program transformation process associated with the system 200 of FIG. 2 or the program transformation system 106 of FIG. 1 for precise analysis of enterprise applications, in accordance with an embodiment of the present disclosure. The program transformation process is explained with reference to a C language program.

As seen in FIG. 3, the system 200 receives a computer program as an input. The received program may also include some SQL and service call statements. The system 200 then performs pre-compilation of the computer program using a pre-compiler to obtain a pre-compiled program. Thereafter, the system 200 performs an SQL abstraction process in which the SQL statements present in the pre-compiled C program are transformed into C programming language statements. Further, the system 200 performs service call replacement process in which service call statements present in the pre-compiled C program are replaced with function call statements. The updated C program is then used by the system 200 for performing data flow analysis using a C language based code analyzer. The data flow analysis is further utilized by the system to perform data dependency analysis of the C program using the C language based code analyzer. In an embodiment, the computed data dependency analysis is stored in the database 208 for future use.

FIG. 4, with reference to FIGS. 1 through 3, illustrates an exemplary flow diagram of a method 400 for performing program transformations for precise analysis of enterprise applications, in accordance with an embodiment of the present disclosure. The method 400 may use the system 200 of FIG. 2 and program transformation system 106 of FIG. 1 for execution. In an embodiment, the system 200 comprises one or more data storage devices or the memory 202 operatively coupled to the one or more hardware processors 204 and is configured to store instructions for execution of steps of the method 400 by the one or more hardware processors 204. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 200 as depicted in FIG. 2, and the program transformation system 106 of FIG. 1.

In an embodiment of the present disclosure, at step 402, the one or more hardware processors 204 of the system 200 receive a computer program written in a high-level host programming language. Examples of the high-level host programming language may include, but are not limited to, C, C++, Java, COBOL, etc. The received computer program includes a plurality of host programming language statements, one or more domain specific language (DSL) statements and one or more service calls. In an embodiment, the DSL statements are SQL statements. In one embodiment, the system 200 may receive the computer program in form of a project file that captures an enterprise application that need to be analyzed. The project file may include details, such as source code location, programs in the enterprise application, entry point of the enterprise application etc.

At step 404 of the present disclosure, the one or more hardware processors 204 of the system 200 transform each DSL statement present in the computer program into one or more host programming language statements using a predefined DSL abstraction template to obtain a primary transformed computer program. Each host programming language statement of the one or more host programming language statements in the primary transformed computer program include an abstract function call that is configured to retain effect of a portion of a DSL statement from which the corresponding abstract function call is obtained. The above step 404 is better understood by way of following description.

Figure 5:
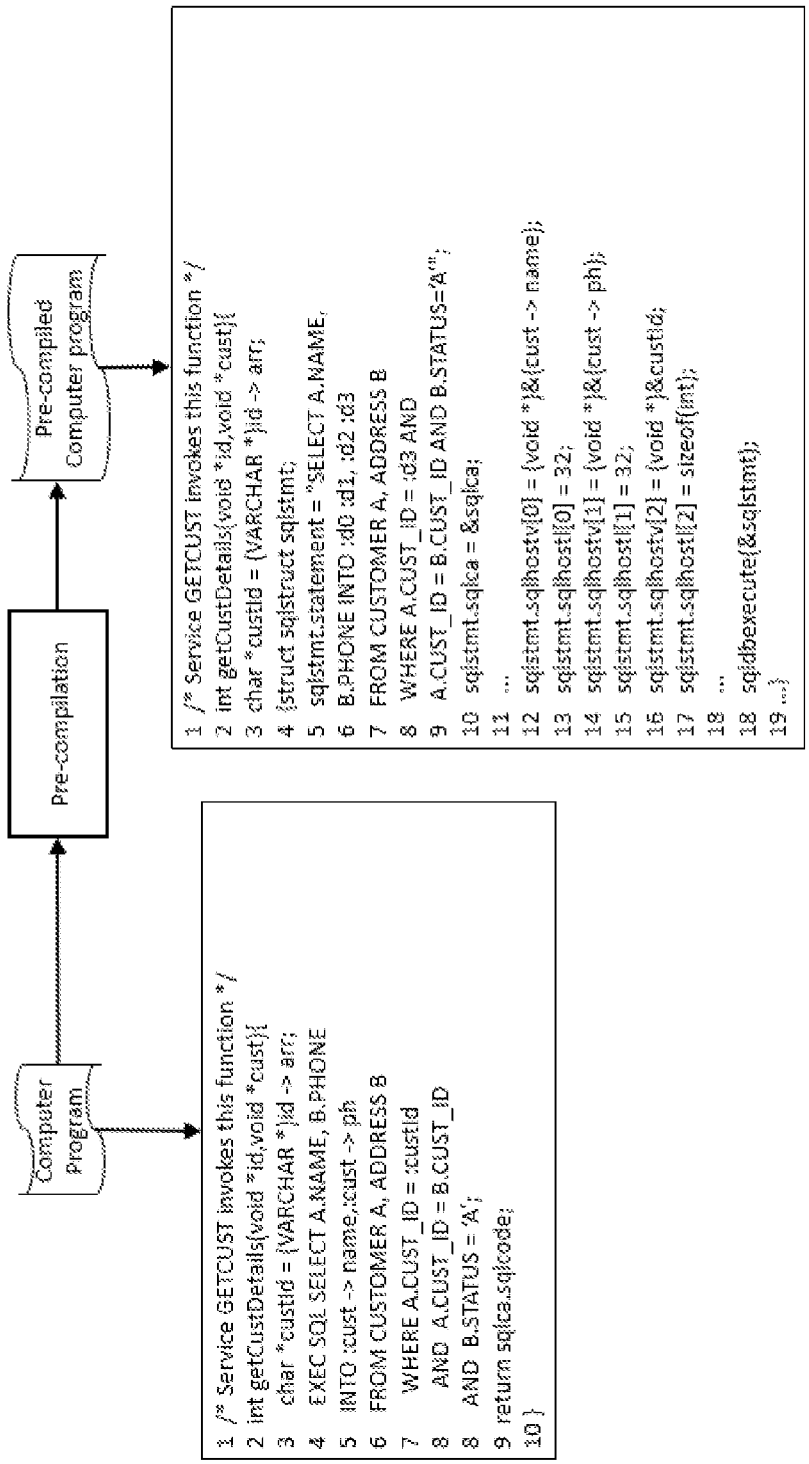
FIG. 5 illustrates an example representation of a pre-compiled host programming language program that is obtained after translation of one or more domain specific language (DSL) statements that are present in a computer program, in accordance with an embodiment of the present disclosure.
Figure 6:
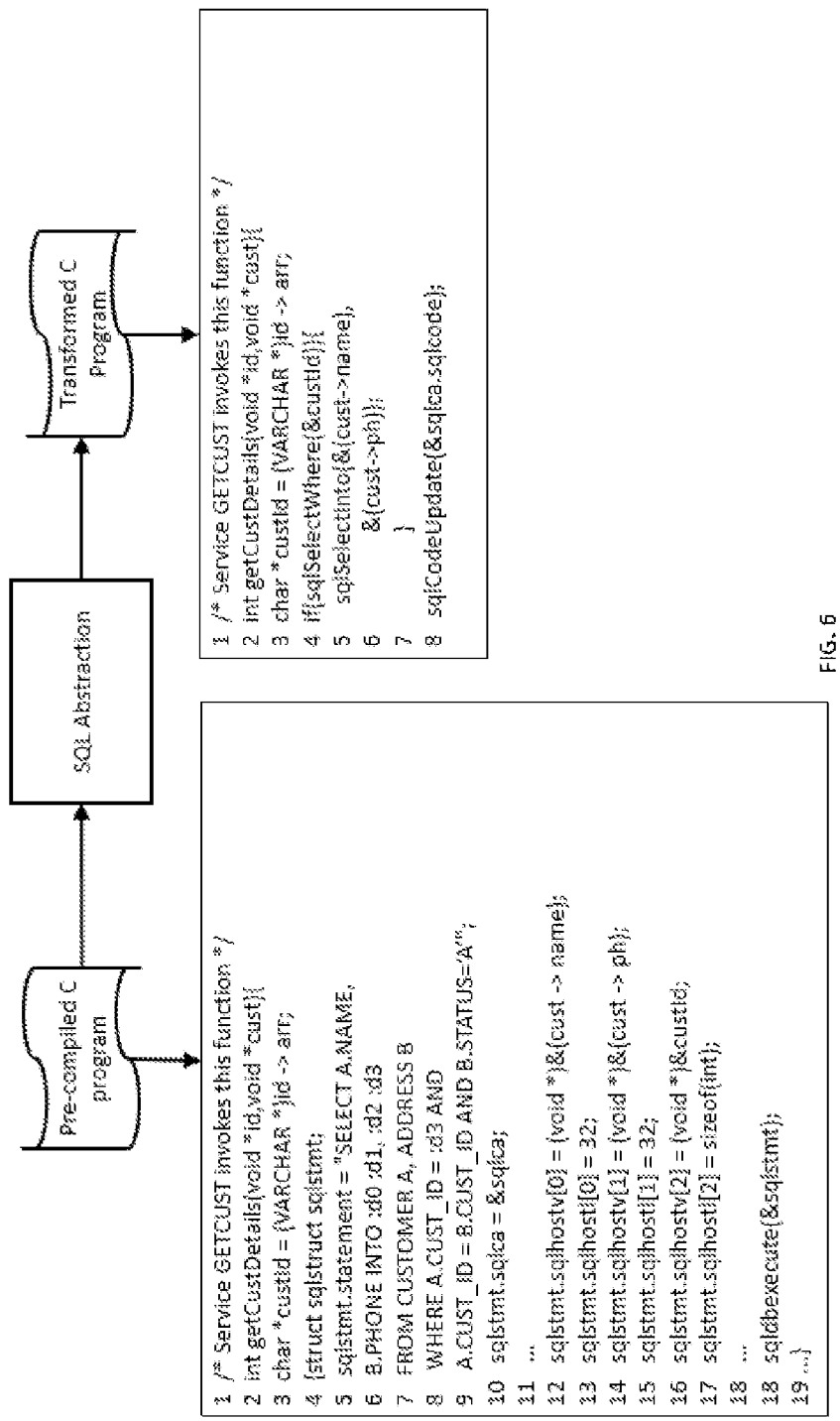
FIG. 6 is an example representation of a primary transformed computer program that is obtained after transforming each DSL statement of the one or more DSL statements that are present in the pre-compiled host programming language program, in accordance with an embodiment of the present disclosure.
Figure 7:
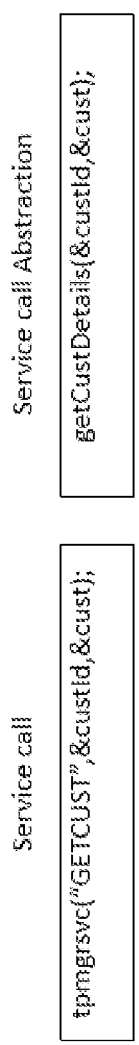
FIG. 7 is an example representation of an updated primary transformed computer program, in accordance with an embodiment of the present disclosure.

After receiving the computer program, the system 200 first performs pre-compilation of the computer program using a pre-compiler to obtain a pre-compiled host programming language program. Examples of the pre-compiler that can be used include pre-compilers provided by various database vendors such as ORACLE, IBM (for DB2), Microsoft (SQL Server). In an embodiment, the pre-compiler translates each DSL statement present in the computer program into a block of host programming language statements. Basically, the pre-compiler translates each DSL statement into one or more library calls after populating required information into a suitable data structure. An example representation of the pre-compiled host programming language program that is obtained after translation of the one or more DSL statements that are present in the computer program i.e., a C program is shown with reference to FIG. 5. Though the DSL statements are translated into host programming language statements at this stage, but direct analysis cannot be performed on the pre-compiled host programming language program as analysis of such translated language program include various challenges. First, the translation depends on the type of database, so it varies for every database and hence there is no consistency in the translated language program. Secondly, the code analyzers can be imprecise while performing analysis of arrays present in the pre-compiled host programming language program. For example, as can be seen in FIG. 5, a code analyzer can suggest that both cust->name, cust->ph and custId are modified in the library function sqldbexecute, whereas actually in the SQL custId is used and cust->name, and cust->ph are modified. Thirdly, all the DSL statements i.e., SQL statements present in the pre-compiled host programming language program are translated to a single library call sqldbexecute (see, FIG. 5), therefore the code analyzer can make only a conservative judgment for all the host variables of all SQL statements, whereas different SQL statements and their clauses can have different effects on the host variables. Lastly, as can be seen in FIG. 5, the size of the translated code i.e., the pre-compiled host programming language program is very large, so the performance of the code analyzer that is performing analysis on the pre-compiled host programming language program is significantly impacted.

So, to overcome the various challenges that are involved in performing direct analysis on the pre-compiled host programming language program, the system 200, once the pre-compiled host programming language program is available, creates an internal representation (IR) of the pre-compiled host programming language program. The IR is a graphical representation of the pre-compiled host programming language program that helps in analysis of the program. The IR includes one or more nodes for representing one or more program elements present in the pre-compiled host programming language program. The one or more program elements include one or more of one or more computational units, one or more blocks, one or more statements, one or more expressions, and one or more symbols. In particular, the program elements present in the IR are arranged in hierarchy. So, the IR includes one or more computational units, where each computational unit includes one or more blocks, each block includes one or more statements, each statement includes one or more expressions, and each expression includes one or more symbols. Examples of the symbols include, but are not limited to, function names, constants, variable names, and data types etc.

Once the IR of the pre-compiled host programming language program is available, the hardware processors 204 of the system 200 use the IR to transform each DSL statement present in the pre-compiled host programming language program into one or more host programming language statements using the predefined DSL abstraction template. An example representation of the DSL abstraction template is shown with reference to FIG. 8. In particular, the system 200, for each block of the one or more block that is represented as a node in the IR, first determines whether a block is a DSL block based on a predefined DSL block identification criterion. In an embodiment, the predefined DSL block identification criterion includes checking whether a block starts with a specific SQL structure variable, such as SQLSTM and ends with SQL DB manager call.

Upon determining that the block is the DSL block, the system then determines a type of a DSL statement present in the DSL block based on one or more DSL statement clauses present in the respective DSL statement. For example, in case the DSL is the SQL, the type of DSL statement can be select statement, insert statement, delete statement, update statement, fetch statement and the like. Similarly, the statement clauses can be INTO clause, VALUES clause, SET clause, FROM clause, WHERE clause, GROUP by clause, HAVING clause, etc.

Thereafter, the system 200 determines at least one host variable present in each DSL statement clause of the one or more DSL statement clauses present in the DSL statement. So, the at least one host variable that is used in each DSL statement clause is determined. Further, the system 200 performs clause classification of the at least one host variable as one of a used variable or a modified variable based on a DSL statement clause comprising the at least one host variable. In particular, once the at least one host variable present in each DSL statement clause is determined, the system 200 classify whether the at least one host variable is used or modified in the respective DSL statement.

The system 200 then identify the abstract function call for each DSL statement clause present in the DSL statement based, at least in part, on a type of the respective DSL statement and clause classification of the respective DSL statement clause using the predefined DSL abstraction template. For example, in case the DSL is the SQL, once the type of the DSL statement i.e., whether the DSL statement comprising the DSL statement clause is a select statement or an insert statement or a fetch statement and the clause classification of the at least one host variable present in the DSL statement clause is done i.e., whether the clause host variable is modified or used, the system 200 look for the abstract function call in the predefined DSL abstraction template (see, FIG. 8) that can be used in place of the DSL statement clause based on the determined type and the clause classification of the at least one host variable.

Once the abstract function call for each DSL statement clause present in the DSL statement is identified, the system 200 updates each DSL statement clause present in the DSL statement with the abstract function call identified for the respective DSL statement clause to obtain the one or more host programming language statements for the DSL statement present in the DSL block. The abstract function call includes the at least one host variable present in the respective DSL statement clause as a parameter of the abstract function call.

Finally, when each DSL statement clause present in the DSL statement is updated with the abstract function call, the system 200 identifies updated computer program i.e., the updated pre-compiled host programming language program is identified as the primary transformed computer program. An example representation of the primary transformed computer program that is obtained after transforming each DSL statement of the one or more DSL statements that are present in the pre-compiled host programming language program i.e., a C program is shown with reference to FIG. 6.

In case it is determined that the block is not a DSL block, the system 200 directly copies a statement of the block in the primary transformed computer program.

At step 406 of the present disclosure, the one or more hardware processors 204 of the system 200 update each service call of the one or more service calls present in the primary transformed computer program with a function call statement using a predefined service registry to obtain a secondary transformed computer program. The above step 406 is better understood by way of following description.

Once the primary transformed computer program is available, the system 200 tries to replace one or more service call statements present in the primary transformed computer program as the code analyzer cannot analyze indirectly called functions through service call statements. So, to avoid imprecise data flow analysis by the existing pre-compiled host programming language program, the system 200, for each statement of the one or more statements that is represented as a node in the IR, first determines whether a statement is a service call based on a predefined service call identification criterion. In an embodiment, the predefined service call identification criterion is to check whether statement is starting with 'tpmgrsvc'.

Thereafter, upon determining that the statement is the service call, the system identifies service name and one or more service function parameters that are present in the service call. For example, the received computer program as mentioned below is considered:

```
1  #define str2vchr(v,s) if (s==NULL){\
2  v##ind=-1;}else{\
3  v.len=strlen(s);memcpy(v.arr,s,v.len);}
4  #define vchr2str(s,v) if (v##ind==-1){\
5  s=NULL;}else{
6  memcpy(s,v.arr,v.len); *(s+v.len)='\0';}
7  /* Global variables and structures */
8  int acctNum,acctTyp;
9  VARCHAR custId[30],custNm[30],custPh[15];
10 struct {VARCHAR name[30], ph[15];} cust;
11 typedef struct {int acct;char *name;
12 char *ph} account;
13 /* OPENACCT Service function to */
14 /* open a new account */
15 int openAccount(input *in, account *out){
16 acctTyp=in->typ;
17 str2vchr(custId.arr,in->cid);
18 EXEC SQL SELECT MAX(ACCTNO)+10
19 INTO :acctNo FROM ACCOUNT
20 WHERE RECDATE<SYSDATE;
21 /* Call getCustDetails function
22  * using GETCUST service */
23 tpmgrsvc("GETCUST",&custId,&cust);
24 memcpy(custNm.arr,cust.name.arr,30);
25 memcpy(custPh.arr,cust.ph.arr,15);
26 EXEC SQL INSERT INTO ACCOUNT
27    (ACCTNO,NAME,PHONE,TYPE,STATUS,RECDATE)
28 VALUES (:acctNo,custNm,:custPh,:acctTyp,
29 0,SYSDATE);
30 if(sqlca.sqlcode==0){
31 out->acct=acctNo;
32 vchr2str(out->name,custNm.arr);
33 vchr2str(out->ph, custPh.arr);
34 printf("Cust. Name=\%s",out->name);
35 }
36 return 0;
37}.
```

The system 200 identifies statement present at line number 23 as the service call. Thereafter, the system identifies GETCUST as service name and '&custId,&cust' as the service function parameters associated with the service call.

Further, the system 200 determines the function call statement present corresponding to the service name in the predefined service registry. It should be noted that the pre-defined service registry is either obtained from third-party transaction managers, such as Tuxedo, Customer Information Control System (CICS) or it is prepared by administrators of the system 200. So, the system 200 may identify getCustDetails as a service function associated with the service name GETCUST in the predefined service registry. The system 200 then updates the service call present in the primary transformed computer program with the identified function call statement to obtain an updated primary transformed computer program. An example representation of the updated primary transformed computer program is shown with reference to FIG. 7.

Once all the service call statements present in the primary transformed computer program are replaced with the function call statements, the system 200 identifies the updated primary transformed computer program as the secondary transformed computer program. It should be noted that in case it is determined that the statement is not a service call, the system 200 may perform copying of the statement in the secondary transformed computer program.

At step 408 of the present disclosure, the one or more hardware processors 204 of the system 200 compute one or more analysis on the secondary transformed computer program using a host programming language based code analyzer to obtain intermediatory analysis information. It should be noted that the host programming language based code analyzer is a code analysis tool available in the art. In an embodiment, the one or more analysis that are performed by the system 200 on the secondary transformed computer program includes at least one of a pointer analysis, a reaching definition analysis, and a def-use analysis. In an embodiment, the system 200 may use facts file comprising information about user specified function summaries, and environment file comprising information about repository directory, output directory and other parameters required for analysis along with the secondary transformed computer program for performing the analysis. In one embodiment, the obtained intermediatory analysis information is stored in the database 208. In particular, the system 200 uses function summaries of abstract function calls for precise data flow computation in the computer program.

In an embodiment, at step 410 of the present disclosure, the one or more hardware processors 204 of the system 200 perform dependency analysis of the computer program based on the intermediatory analysis information using the host programming language based code analyzer. The dependency analysis includes information about one or more variables that are present in the computer program. The system 200 uses the same code analyzer for computing data dependency nodes from the intermediatory analysis information based on a slicing criterion.

In an embodiment, the system 200 can directly receive a data dependence analysis query request from a user device, such as the user device 102 along with the computer program. The data dependence analysis query request may include information about a variable whose data dependency information is required i.e., statements and variables that are impacting the mentioned variable in the computer program is required. In such cases, the system 200 is configured to perform a dependency analysis process for the variable using the steps 402 to 410 and provide the dependency analysis information to the user by displaying the dependency analysis information on their user device, such as the user device 102 using the network 104.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, conventional code analyzers that are available for performing program analysis are developed for commonly used programming languages so that they can be re-used across multiple re-engineering projects. In general, these lack support for analyzing database processing statements, such as structured query language (SQL) statements and inter-service communication statements that may be present along with the programming language statements in the projects. So, to overcome the disadvantages, embodiments of the present disclosure provide a method and a system for performing program transformations for precise analysis of the enterprise applications. More specifically, the system transforms the program written in mixed syntax into host language programs that can be analyzed using existing code analyzers, thereby eliminating need of enhancing existing code analyzers to support mixed syntax analysis while improving accuracy of the analysis. Further, the system and the method replace statements present in program that does not play any role in the analysis of the program with skip statements and also removes a plurality of statements that are added at the pre-compilation stage, thereby reducing time taken in performing analysis of the programs.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, by a program transformation system via one or more hardware processors, a computer program written in a high-level host programming language, wherein the computer program comprises a plurality of host programming language statements, one or more domain specific language (DSL) statements and one or more service calls;
transforming, by the program transformation system via the one or more hardware processors, each DSL statement present in the computer program into one or more host programming language statements using a predefined DSL abstraction template to obtain a primary transformed computer program, wherein each host programming language statement of the one or more host programming language statements in the primary transformed computer program comprises an abstract function call that is configured to retain effect of a portion of a DSL statement from which the corresponding abstract function call is obtained;
updating, by the program transformation system via the one or more hardware processors, each service call of the one or more service calls present in the primary transformed computer program with a function call statement using a predefined service registry to obtain a secondary transformed computer program;
computing, by the program transformation system via the one or more hardware processors, one or more analysis on the secondary transformed computer program using a host programming language based code analyzer to obtain intermediatory analysis information; and
performing, by the program transformation system via the one or more hardware processors, dependency analysis of the computer program based on the intermediatory analysis information using the host programming language based code analyzer, wherein the dependency analysis comprises information about one or more variables that are present in the computer program.

2. The processor implemented method of claim 1, wherein the step of transforming, by the program transformation system via the one or more hardware processors, each DSL statement present in the computer program into one or more host programming language statements using the predefined DSL abstraction template to obtain the primary transformed computer program is preceded by:
performing, by the program transformation system via the one or more hardware processors, pre-compilation of the computer program using a pre-compiler to obtain a pre-compiled host programming language program; and
creating, by the program transformation system via the one or more hardware processors, an internal representation (IR) of the pre-compiled host programming language program, the IR comprising one or more nodes for representing one or more program elements present in the pre-compiled host programming language program, wherein the one or more program elements comprise one or more of: one or more computational units, one or more blocks, one or more statements, one or more expressions, and one or more symbols.

3. The processor implemented method of claim 2, wherein the step of transforming, by the program transformation system via the one or more hardware processors, each DSL statement present in the computer program into one or more host programming language statements using the predefined DSL abstraction template to obtain the primary transformed computer program comprises:
for each block of the one or more block that is represented as a node in the IR, performing:
determining, by the program transformation system via the one or more hardware processors, whether a block is a DSL block based on a predefined DSL block identification criterion;
upon determining that the block is the DSL block, identifying, by the program transformation system via the one or more hardware processors, a type of a DSL statement present in the DSL block based on one or more DSL statement clauses present in the respective DSL statement;
collecting, by the program transformation system via the one or more hardware processors, at least one host variable present in each DSL statement clause of the one or more DSL statement clauses present in the DSL statement;
performing, by the program transformation system via the one or more hardware processors, clause classification of the at least one host variable as one of a: used variable or modified variable based on a DSL statement clause comprising the at least one host variable;
identifying, by the program transformation system via the one or more hardware processors, an abstract function call for each DSL statement clause present in the DSL statement based, at least in part, on a type of the respective DSL statement and clause classification of the respective DSL statement clause using the predefined DSL abstraction template; and
updating, by the program transformation system via the one or more hardware processors, each DSL statement clause present in the DSL statement with the abstract function call identified for the respective DSL statement clause to obtain the one or more host programming language statements for the DSL statement present in the DSL block, wherein the abstract function call comprise the at least one host variable present in the respective DSL statement clause as a parameter; and
identifying, by the program transformation system via the one or more hardware processors, updated computer program as the primary transformed computer program.

4. The processor implemented method of claim 2, wherein the step of updating, by the program transformation system via the one or more hardware processors, each service call of the one or more service calls present in the primary transformed computer program with a function call statement using the predefined service registry to obtain the secondary transformed computer program comprises:
for each statement of the one or more statements that is represented as a node in the IR, performing:
determining, by the program transformation system via the one or more hardware processors, whether a statement is a service call based on a predefined service call identification criterion;
upon determining that the statement is the service call, identifying, by the program transformation system via the one or more hardware processors, service name and one or more service function parameters that are present in the service call;
identifying, by the program transformation system via the one or more hardware processors, the function call statement present corresponding to the service name in the predefined service registry; and updating, by the program transformation system via the one or more hardware processors, the service call present in the primary transformed computer program with the identified function call statement to obtain an updated primary transformed computer program, wherein the identified function call statement comprises the one or more service function parameters as one or more function call parameters; and identifying, by the program transformation system via the one or more hardware processors, the updated primary transformed computer program as the secondary transformed computer program.

5. The processor implemented method of claim 1, wherein each DSL statement of the one or more DSL statements comprises a structured query language (SQL) statement.

6. The processor implemented method of claim 1, wherein the one or more analysis comprises at least one of a: pointer analysis, reaching definition analysis, and def-use analysis.

7. A program transformation system, comprising:
a memory storing instructions;
one or more communication interfaces; and
one or more hardware processors coupled to the memory via the one or more communication interfaces, wherein the one or more hardware processors are configured by the instructions to:
receive a computer program written in a high-level host programming language, wherein the computer program comprises a plurality of host programming language statements, one or more domain specific language (DSL) statements and one or more service calls;
transform each DSL statement present in the computer program into one or more host programming language statements using a predefined DSL abstraction template to obtain a primary transformed computer program, wherein each host programming language statement of the one or more host programming language statements in the primary transformed computer program comprises an abstract function call that is configured to retain effect of a portion of a DSL statement from which the corresponding abstract function call is obtained;
update each service call of the one or more service calls present in the primary transformed computer program with a function call statement using a predefined service registry to obtain a secondary transformed computer program;
compute one or more analysis on the secondary transformed computer program using a host programming language based code analyzer to obtain intermediatory analysis information; and
perform dependency analysis of the computer program based on the intermediatory analysis information using the host programming language based code analyzer, wherein the dependency analysis comprises information about one or more variables that are present in the computer program.

8. The system of claim 7, wherein the step of transforming each DSL statement present in the computer program into one or more host programming language statements using the predefined DSL abstraction template to obtain the primary transformed computer program is preceded by:
perform pre-compilation of the computer program using a pre-compiler to obtain a pre-compiled host programming language program; and create an internal representation (IR) of the pre-compiled host programming language program, the IR comprising one or more nodes for representing one or more program elements present in the pre-compiled host programming language program, wherein the one or more program elements comprises one or more of: one or more computational units, one or more blocks, one or more statements, one or more expressions, and one or more symbols.

9. The system of claim 8, wherein for transforming each DSL statement present in the computer program into one or more host programming language statements using the predefined DSL abstraction template to obtain the primary transformed computer program, the system is caused to:
for each block of the one or more block that is represented as a node in the IR, perform:
determine whether a block is a DSL block based on a predefined DSL block identification criterion;
upon determining that the block is the DSL block, identify a type of a DSL statement present in the DSL block based on one or more DSL statement clauses present in the respective DSL statement;
collect at least one host variable present in each DSL statement clause of the one or more DSL statement clauses present in the DSL statement;
perform clause classification of the at least one host variable as one of a: used variable or modified variable based on a DSL statement clause comprising the at least one host variable;
identify an abstract function call for each DSL statement clause present in the DSL statement based, at least in part, on a type of the respective DSL statement and clause classification of the respective DSL statement clause using the predefined DSL abstraction template; and
update each DSL statement clause present in the DSL statement with the abstract function call identified for the respective DSL statement clause to obtain the one or more host programming language statements for the DSL statement present in the DSL block, wherein the abstract function call comprises the at least one host variable present in the respective DSL statement clause as a parameter; and
identify updated computer program as the primary transformed computer program.

10. The system of claim 8, wherein for updating each service call of the one or more service calls present in the primary transformed computer program with a function call statement using the predefined service registry to obtain the secondary transformed computer program, the system is caused to:
for each statement of the one or more statements that is represented as a node in the IR, perform:
determine whether a statement is a service call based on a predefined service call identification criterion;
upon determining that the statement is the service call, identify service name and one or more service function parameters that are present in the service call;
identify the function call statement present corresponding to the service name in the predefined service registry; and
update the service call present in the primary transformed computer program with the identified function call statement to obtain an updated primary transformed computer program, wherein the identified function call statement comprises the one or more service function parameters as one or more function call parameters; and identify the updated primary transformed computer program as the secondary transformed computer program.

11. The system of claim 7, wherein each DSL statement of the one or more DSL statements comprises a structured query language (SQL) statement.

12. The system of claim 7, wherein the one or more analysis comprises at least one of a: pointer analysis, reaching definition analysis, and def-use analysis.

13. One or more non-transitory machine-readable information storage mediums comprising one or more instructions which when executed by one or more hardware processors cause:

receiving, by a program transformation system via one or more hardware processors, a computer program written in a high-level host programming language, wherein the computer program comprises a plurality of host programming language statements, one or more domain specific language (DSL) statements and one or more service calls;

transforming, by the program transformation system, each DSL statement present in the computer program into one or more host programming language statements using a predefined DSL abstraction template to obtain a primary transformed computer program, wherein each host programming language statement of the one or more host programming language statements in the primary transformed computer program comprises an abstract function call that is configured to retain effect of a portion of a DSL statement from which the corresponding abstract function call is obtained;

updating, by the program transformation system, each service call of the one or more service calls present in the primary transformed computer program with a function call statement using a predefined service registry to obtain a secondary transformed computer program;

computing, by the program transformation system, one or more analysis on the secondary transformed computer program using a host programming language based code analyzer to obtain intermediatory analysis information; and performing, by the program transformation system, dependency analysis of the computer program based on the intermediatory analysis information using the host programming language based code analyzer, wherein the dependency analysis comprises information about one or more variables that are present in the computer program.

14. The one or more non-transitory machine-readable information storage mediums of claim 13, wherein the step of transforming, by the program transformation system, each DSL statement present in the computer program into one or more host programming language statements using the predefined DSL abstraction template to obtain the primary transformed computer program is preceded by:

performing, by the program transformation system, pre-compilation of the computer program using a precompiler to obtain a pre-compiled host programming language program; and creating, by the program transformation system, an internal representation (IR) of the pre-compiled host programming language program, the IR comprising one or more nodes for representing one or more program elements present in the pre-compiled host programming language program, wherein the one or more program elements comprises one or more of: one or more computational units, one or more blocks, one or more statements, one or more expressions, and one or more symbols.

15. The one or more non-transitory machine-readable information storage mediums of claim 14, wherein the step of transforming, by the program transformation system, each DSL statement present in the computer program into one or more host programming language statements using the predefined DSL abstraction template to obtain the primary transformed computer program comprises:

for each block of the one or more block that is represented as a node in the IR, performing:

determining, by the program transformation system, whether a block is a DSL block based on a predefined DSL block identification criterion;

upon determining that the block is the DSL block, identifying, by the program transformation system, a type of a DSL statement present in the DSL block based on one or more DSL statement clauses present in the respective DSL statement;

collecting, by the program transformation system, at least one host variable present in each DSL statement clause of the one or more DSL statement clauses present in the DSL statement;

performing, by the program transformation system, clause classification of the at least one host variable as one of a: used variable or modified variable based on a DSL statement clause comprising the at least one host variable;

identifying, by the program transformation system, an abstract function call for each DSL statement clause present in the DSL statement based, at least in part, on a type of the respective DSL statement and clause classification of the respective DSL statement clause using the predefined DSL abstraction template; and updating, by the program transformation system, each DSL statement clause present in the DSL statement with the abstract function call identified for the respective DSL statement clause to obtain the one or more host programming language statements for the DSL statement present in the DSL block, wherein the abstract function call comprises the at least one host variable present in the respective DSL statement clause as a parameter; and identifying, by the program transformation system, updated computer program as the primary transformed computer program.

16. The one or more non-transitory machine-readable information storage mediums of claim 14, wherein the step of updating, by the program transformation system, each service call of the one or more service calls present in the primary transformed computer program with a function call statement using the predefined service registry to obtain the secondary transformed computer program comprises:

for each statement of the one or more statements that is represented as a node in the IR, performing:

determining, by the program transformation system, whether a statement is a service call based on a predefined service call identification criterion;

upon determining that the statement is the service call, identifying, by the program transformation system, service name and one or more service function parameters that are present in the service call;

identifying, by the program transformation system, the function call statement present corresponding to the service name in the predefined service registry; and updating, by the program transformation system, the service call present in the primary transformed computer program with the identified function call statement to obtain an updated primary transformed computer program, wherein the identified function call statement comprises the one or more service function parameters as one or more function call parameters; and identifying, by the program transformation system, the updated primary transformed computer program as the secondary transformed computer program.

17. The one or more non-transitory machine-readable information storage mediums of claim 13, wherein each DSL statement of the one or more DSL statements comprises a structured query language (SQL) statement.

18. The one or more non-transitory machine-readable information storage mediums of claim 13, wherein the one or more analysis comprises at least one of a: pointer analysis, reaching definition analysis, and def-use analysis.

* * * * *